United States Patent Office 3,431,087
Patented Mar. 4, 1969

3,431,087
METHOD FOR THE PREPARATION OF HIGH PURITY NITRONIUM SALTS
Stephen J. Kuhn, Sarnia, Ontario, Canada, assignor to The Dow Chemical Company, Midland, Mich., a corporation of Delaware
No Drawing. Filed Feb. 23, 1962, Ser. No. 175,299
U.S. Cl. 23—356    7 Claims
Int. Cl. C01b 21/20

This invention is concerned with nitronium salts and more particularly is concerned with a new method for the preparation of high purity solid nitronium salts which are substantially free from impurities.

The existence and characteristics of solid nitronium salts such as nitronium tetrafluoroborate, nitronium hexafluorophosphate, dinitronium hexafluorosilicate and nitronium hexafluoroantimonate for example, have been known for some time.

These salts at present ordinarily are prepared by one of the following techniques: (1) nitrogen peroxide ($NO_2$) together with bromine trifluoride ($BrF_3$) acts on a suitable material such as a metal, oxide, oxy-salt or halide which is capable of reacting on the bromine trifluoride either as a Lewis acid or base [Woolf and Emeleus, J. Chem. Soc. 1050 (1950); (2) preparation of nitryl fluoride ($NO_2F$) and subsequent reaction of this compound with a suitable Lewis acid, e.g., a non-metallic fluoride [Aynsley, Heterington and Robinson, J. Chem. Soc. 119 (1954)]; and, (3) adding a mixture of anhydrous hydrofluoric acid and an appropriate fluoride compound to a preparation of dinitrogen pentoxide ($N_2O_5$) dissolved in nitromethane [Schmeisser and Elisher, Z. Naturforsch., 7b, 583 (1952)].

All of these listed processes for the preparation of solid nitronium salts suffer from one or more of the following defects and/or difficulties; the operations are multi-step; nitrogen oxide based starting materials, e.g. $N_2O_5$ and $NO_2F$ are both expensive and not readily commercially available; the resulting nitronium salts are relatively impure; and, complicated reactor equipment is needed and the reactions are both difficult and somewhat dangerous to carry out.

Applicant recently has disclosed in a copending application Ser. No. 139,374, filed Sept. 20, 1961, a new, safe and straight-forward method for producing these salts by introducing, in certain specific proportions, a fluorine containing Lewis acid substance into a solution of nitric acid and substantially anhydrous fluoride while maintaining the temperature of the reaction mixture between about 20° C. and the freezing point of the mixture. In the process of this copending application, the nitronium salt product precipitates during the course of the reaction and readily can be separated from the reaction mixture. The salt product, as produced by the method disclosed in this copending application is relatively pure, but contains some nitrozonium salt impurities resulting from the presence of nitric oxide impurities always present in the nitric acid reactant.

It is a principal object of the present invention, therefore, to provide a new and novel process for the preparation of high purity solid nitronium salts free of impurities and particularly free from nitrozonium salt impurities.

It is an additional object of the present invention to provide a safe, straight-forward one step method for the preparation of extremely high purity, solid nitronium salts which permits the use of readily available commercial materials as reactants.

It is a further object of the present invention to provide a method for preparing solid nitronium salts which does not require complicated reaction apparatus nor the prior preparation of either nitryl fluoride or nitrogen pentoxide.

These and other objects and advantages will become apparent from the detailed description for the method of the instant invention presented hereinafter.

In accordance with the method of the present invention, a Lewis acid substance, and particularly a fluoride acid substance is introduced into a solution of a nitric acid ester and anhydrous hydrogen fluoride or into a solution of these compounds carried in nitromethane and the reaction mixture is agitated while being maintained at a temperature ranging from about the freezing point of the mixture to about 20° above zero centigrade. The resulting nitronium salt product, which precipitates during the course of the reaction, then is separated from the reaction mixture. The term "fluoride acid substance" or "fluoride acid" as used herein refers to those fluorine-containing materials capable of accepting a pair of electrons in the formation of a bond as set forth by the Lewis theory of acids and bases.

Ordinarily, in the instant method, the nitric acid ester and hydrogen fluoride will be carried in a nitromethane solvent. However, use of this latter compound is not essential as an excess of the anhydrous hydrogen fluoride itself can be used as a solvent for the reactants.

Preferably, as indicated hereinbefore, the Lewis acid substance which reacts with the nitronium ion to form the salt will be a fluoride compound and ordinarily will be a polyfluoride compound of general formula $MF_n$ wherein the second member M is a metal, metalloid or non-metallic species selected from groups III to VII inclusive of the periodic table and $n$ is an integer equal to the valence state of the substance M in the polyfluoride. Examples of a few useful Lewis acid nitronium salt formers are: boron trifluoride ($BF_3$), phosphorus pentafluoride ($PF_5$), silicon tetrafluoride ($SiF_4$) and the like.

Nitric acid esters used in the process are well characterized uniform compounds unlike nitric acid, which always has some nitrogen oxide dissolved therein, and readily are available in high purity. The selection of a nitric acid ester reactant is not critical or limited. Ordinarily, alkyl nitric acid esters corresponding to the general formula $RONO_2$, wherein R represents an alkyl group having from 1 to about 5 carbon atoms are used since these are commercially available in high purity. Preferably ethyl nitrate ($C_2H_5ONO_2$) is employed as the nitronium ion source in the present process.

The anhydrous hydrogen fluoride to be used preferably is selected from those substantially anhydrous materials which assay from about 98 to about 100 percent hydrogen fluoride.

In actual operation of the process, the relative proportion of nitric acid ester to anhydrous hydrogen fluoride in the initial solution ranges from about 1/1 to about 2/1 on a molar basis. Ordinarily, reaction mixtures utilizing about stoichiometric quantities of hydrogen fluoride and nitric acid ester will be employed as either an excess of hydrogen fluoride or the nitric acid ester dissolves a portion of the product in the reaction mixture thereby reducing the product yield. The ratio of the Lewis acid to the nitric acid ester ranges from about 1 to about 3 times the stoichiometric molar quantities needed for salt production. Preferably, from about 1.5 to about 2.0 molar equivalents of the Lewis acid per molar equivalent of the nitric acid ester, will be employed. This excess quantity of Lewis acid is desired since a portion of the Lewis acid reacts with water formed during the reaction.

The amount of either nitromethane or excess hydrogen fluoride solvent to be used is not critical. Generally, the amount of solvent utilized will be up to about 150 grams per mole of the reactants present.

The upper operative limit of temperature is the boiling point of the hydrogen fluoride, about 20° centigrade at atmospheric pressure, and the lower limit is the freezing point of the reaction mixture, i.e. from about 30 to about 40° below zero centigrade. A preferred operating temperature range is from about 20° below zero to about 15° above zero centigrade.

The reaction time is not critical as the nitronium salt precipitates almost instantaneously as the Lewis acid contacts the nitric acid ester-hydrogen fluoride mixture. A smooth reaction which gives control of a preselected operating temperature is obtained if the Lewis acid is introduced slowly and controllably into the nitric acid ester-hydrogen fluoride mixture while the entire reaction mass is being agitated. Such agitation can be carried out using manual, mechanical, electrical or magnetic stirring or by other conventional mixing techniques.

The process can be carried out in reactor vessels or flasks of silica, polyethylene, stainless steel or other materials which do not undergo a prohibitive amount of corrosive attack in the presence of the reactants. Control of the reaction temperature within the desired limits can be achieved through the use of a reactor with integral cooling means or by coupling an external cooling means to a given reactor.

The nitronium salts as produced are white solids and are of a very high purity. These can be removed from the reaction mixture by conventional means such as filtration, centrifugation and the like, and then dried directly. However, if desired, the separated salts can be washed with a small amount of nitromethane and any residual wash material then simply be removed under reduced pressure. Also low boiling inert diluents such as certain of the Freons (trademarked product of E. I. du Pont Co.), methylene chloride, chloroform and the like can be used as a wash to facilitate the subsequent drying of the salts.

The salts find use as oxidizers in high energy fuels. Additionally, these can be used as nitrating agents for aromatic organic compounds especially if anhydrous media are required for the nitrations. Also, they may be used as oxidizers in a number of reactions replacing the conventional oxidizers now being used. The high purity products produced by the instant method are especially suitable for kinetic investigations or for any process or utility requiring extremely high purity nitronium salts.

The following examples will serve to further illustrate the method of the present invention but are not meant to limit it thereto.

EXAMPLE 1

Into a solution comprised of about 0.5 mole of ethyl nitrate and about 0.5 mole of substantially anhydrous hydrogen fluoride in about 60 grams of nitromethane there was added slowly with stirring about 1 mole of gaseous boron trifluoride, the reaction temperature being maintained at from about minus 20 to about positive 15° centigrade. As this addition was being made, a white solid precipitate of nitronium tetrafluoroborate $$(NO_2^+BF_4^-)$$

precipitated in the reaction flask. After the boron trifluoride addition was complete, the stirring was continued for a short while. The white solid precipitate than was filtered from the reaction solution and the separated salt washed twice with two 25 milliliter portions of nitromethane. This product was dried by removing the wash material under reduced pressure. The product yield, based on the amount of ethyl nitrate reactant, was about 93.4%.

Chemical analysis of the salt showed a nitrogen content of 10.5 percent. Calculated nitrogen value for the pure salt is 10.5 percent.

EXAMPLE 2

Using the same technique and procedural steps as set forth in Example 1, 0.75 mole of phosphorus pentafluoride ($PF_5$) was added to a mixture of 0.5 mole of ethyl nitrate and 0.25 mole of anhydrous hydrogen fluoride dissolved in 60 grams of nitromethane. In this preparation low-boiling Freon 113 (a trademarked product of E. I. du Pont Co.) was used as a wash. This facilitated the subsequent drying of the salt since the fluorinated hydrocarbon has a lower boiling point (47.5° C.) than nitromethane, normal boiling point (101° C.). In a number of runs, product yields of from 80 to 90% nitronium hexafluorophosphate ($NO_2^+PF_6^-$) were obtained, and chemical analysis of the salt product for nitrogen gave a value identical with that calculated for pure nitronium hexafluorophosphate.

EXAMPLE 3

One mole of silicon tetrafluoride was added to a solution containing 1 mole of ethyl nitrate and 1 mole of substantially anhydrous hydrogen fluoride acid in about 100 grams of nitromethane according to the procedure described in Example 1.

A white solid dinitronium hexafluorosilicate salt [$(NO_2^+{}_2SiF_6^=)$] which analyzed to have a nitrogen content the same as calculated for the pure product, was produced.

EXAMPLE 4

A number of runs were made reacting boron trifluoride, ethyl nitrate and hydrogen fluoride in nitromethane according to the procedure described in Example 1. In this study, the ratio of $BF_3$ to $C_2H_5ONO_2$ was varied for each test.

Table 1 which follows shows the effect of the $$BF_3:C_2H_5ONO_2$$

ratio on product yield.

TABLE 1

| Run No. | Reactants (moles) | | | Solvent (grams) | ($NO_2^+BF_4^-$) product yield, percent |
|---|---|---|---|---|---|
| | $BF_3$ | $C_2H_5ONO_2$ | HF | | |
| 1 | 0.75 | 0.5 | 0.5 | 60 | 74.9 |
| 2 | 0.875 | 0.5 | 0.5 | 60 | 84.2 |
| 3 | 1.00 | 0.5 | 0.5 | 60 | 93.4 |
| 4 | 1.25 | 0.5 | 0.5 | 60 | 91.0 |

The nitronium tetrafluoroborate product from each of these runs upon analysis was found to be of the same high purity as the products prepared in the preceding examples.

In a manner similar to that described for the foregoing experiments, nitronium tetrafluoroborate can be produced by reacting substantially stoichiometric quantities of borontrifluoride with butyl nitrate in the presence of excess hydrogen fluoride at a temperature of about 10° C. Nitronium hexafluorophosphate can be produced using methyl nitrate-anhydrous hydrogen fluoride reactants in nitromethane solvent and adding a molar excess, based on stoichiometry, of phosphorus pentafluoride thereto at a temperature of about minus 10° centigrade. Also, nitronium hexafluorosilicate can be formed by adding silicon tetrafluoride to a solution of amyl nitrate and anhydrous hydrogen fluoride.

Various modifications can be made in the present invention without departing from the spirit or scope thereof for it is understood that I limit myself only as defined in the appended claims.

I claim:

1. A process for preparing high purity nitronium salts substantially free from nitrozonium salt impurities which comprises: introducing a fluorine containing Lewis acid substance into a solution of a nitric acid ester and substantially anhydrous hydrogen fluoride while maintaining the temperature of the reaction mixture between about 20° C. and the freezing point of the mixture, said Lewis acid substance being a member selected from the group consisting of boron trifluoride, silicon tetrafluoride and phosphorus pentafluoride and said nitric acid ester being an alkyl nitric acid ester corresponding to the general formula $RONO_2$ where R represents an alkyl group having from 1 to about 5 carbon atoms, the relative proportion of said nitric acid ester and substantially anhydrous hydrogen fluoride in the initial reaction solution ranging from about 1/1 to about 2/1 on a molar basis and the ratio of said Lewis acid substance to said nitric acid ester ranging from about 1 to about 3 of the stoichiometric molar quantity needed for salt production thereby to precipitate directly in said reaction mixture the corresponding high purity nitronium salt substantially free from nitrozonium salt impurities.

2. The process as defined in claim 1 wherein there is incorporated the additional step of separating the nitronium salt from the reaction mixture.

3. A process for preparing high purity nitronium salts substantially free from nitrozonium salt impurities which comprises: introducing a Lewis acid fluoride compound into a solution of a nitric acid ester corresponding to the formula $RONO_2$ wherein R is an alkyl radical containing from 1 to 5 carbon atoms and substantially anhydrous hydrogen fluoride dissolved in a solvent selected from the group consisting of nitromethane and excess hydrogen fluoride while maintaining the reaction temperature between about 20° above zero centigrade and 30° below zero centigrade, said Lewis acid fluoride being a member selected from the group consisting of boron trifluoride, silicon tetrafluoride and phosphorus pentafluoride, the relative proportion of said nitric acid ester to said hydrogen fluoride in the initial reaction solution ranging from about 1/1 to about 2/1 on a molar basis and the ratio of said Lewis acid fluoride to said nitric acid ester ranging from about 1.5 to about 2.0 of the stoichiometric molar quantity needed for production of said high purity nitronium salt thereby to precipitate directly in said reaction mixture the corresponding high purity nitronium salt substantially free from nitrozonium salt impurities.

4. The process as defined in claim 3 wherein there is incorporated the additional step of separating the nitronium salt from the reaction mixture.

5. A process for preparing high purity nitronium tetrafluoroborate substantially free from nitrozonium salt impurities which comprises: introducing boron trifluoride into a solution of ethyl nitrate and substantially anhydrous hydrogen fluoride dissolved in nitromethane while maintaining the reaction temperature between about 20° below zero and 15° above zero centigrade, the molar ratio of said boron trifluoride:ethyl nitrate:hydrogen fluoride in the reaction mixture being about 2:1:1, and, separating the resulting solid high purity nitronium tetrafluoroborate substantially free from nitrozonium salt impurities from the reaction mixture.

6. A process for preparing high purity nitronium hexafluorophosphate substantially free from nitrozonium salt impurities which comprises: introducing phosphorus pentafluoride into a solution of ethyl nitrate and substantially anhydrous hydrogen fluoride dissolved in nitromethane while maintaining the reaction temperature between about 20° below zero and 15° above zero centigrade, the molar ratio of said phosphorus pentafluoride: ethyl nitrate:hydrogen fluoride in the reaction mixture being about 3:1:2, and, separating the resulting high purity nitronium hexafluorophosphate substantially free from nitrozonium salt impurities from the reaction mixture.

7. A process for preparing high purity dinitronium hexafluorosilicate substantially free from nitrozonium salt impurities which comprises: introducing silicon tetrafluoride into a solution of ethyl nitrate and substantially anhydrous hydrogen fluoride dissolved in nitromethane while maintaining the reaction temperature between about 20° below zero and 15° above zero centigrade, the molar ratio of said silicon tetrafluoride:ethyl nitrate:hydrogen fluoride in the reaction mixture being about 1:1:1, and, separating the resulting high purity dinitronium hexafluorosilicate substantially free from nitrozonium salt impurities from the reaction mixture.

References Cited

Taylor et al., "Sidgwick's Organic Chemistry of Nitrogen," 1937, pp. 248–252.

Remy, "Treatise on Inorganic Chemistry," 1956, volume I, pp. 599–601, 622.

Maddock et al., "Recent Aspects of the Inorganic Chemistry of Nitrogen," 1957, Special Publication No. 10 of The Chemical Society, London, pp. 23–32.

MILTON WEISSMAN, *Primary Examiner.*

U.S. Cl. X.R.

23—357, 358